United States Patent
Chan et al.

(10) Patent No.: US 10,126,564 B2
(45) Date of Patent: Nov. 13, 2018

(54) OPTICAL IMAGE STABILIZATION MECHANISM

(71) Applicant: TDK TAIWAN CORP., Yangmei, Taoyuan (TW)

(72) Inventors: Yi-Liang Chan, Yangmei Taoyuan (TW); Shang-Yu Hsu, Yangmei Taoyuan (TW)

(73) Assignee: TDK Taiwan Corp., Yangmei Taoyuan (TW)

(*) Notice: Subject to any disclaimer, the term of this patent is extended or adjusted under 35 U.S.C. 154(b) by 0 days.

(21) Appl. No.: 15/361,742

(22) Filed: Nov. 28, 2016

(65) Prior Publication Data
US 2017/0168314 A1 Jun. 15, 2017

Related U.S. Application Data

(60) Provisional application No. 62/265,106, filed on Dec. 9, 2015.

(30) Foreign Application Priority Data

Apr. 29, 2016 (TW) .............................. 105113394 A

(51) Int. Cl.
*G02B 27/64* (2006.01)
*G02B 7/02* (2006.01)
*H02K 41/035* (2006.01)

(52) U.S. Cl.
CPC .......... *G02B 27/646* (2013.01); *G02B 7/023* (2013.01); *H02K 41/0356* (2013.01)

(58) Field of Classification Search
CPC . G02B 7/00; G02B 7/02; G02B 7/021; G02B 7/023; G02B 7/04; G02B 7/09;
(Continued)

(56) References Cited

U.S. PATENT DOCUMENTS

2011/0176046 A1* 7/2011 Hu ........................... G02B 7/08
348/335
2012/0099201 A1* 4/2012 Chan .................... G02B 27/646
359/557
(Continued)

FOREIGN PATENT DOCUMENTS

CN 204086644 U 1/2015
JP 2011065140 A 3/2011
(Continued)

OTHER PUBLICATIONS

Japanese Notice of Allowance issued in corresponding application No. JP2016-238759, dated May 8, 2018, 3 pages.

*Primary Examiner* — Thong Nguyen
(74) *Attorney, Agent, or Firm* — Muncy, Geissler, Olds & Lowe, P.C.

(57) ABSTRACT

An optical image stabilization mechanism is provided, including a holder for holding a lens, a frame, a base, a first coil, a second coil, a displacement sensor, a first magnetic element, a second magnetic element, and a third magnetic element. The frame is movably connected to the holder and the base. The first coil is disposed on a side of the holder. The second coil is disposed on the base. The first and second magnetic elements are disposed on the frame and correspond to the first coil. The magnetic pole direction of the first magnetic element is opposite to that of the second magnetic element. The third magnetic element is disposed on the frame and corresponds to the second coil. The displacement sensor is disposed on the base to detect relative displacement between the lens and the base.

9 Claims, 4 Drawing Sheets

(58) Field of Classification Search
CPC ...... G02B 27/64; G02B 27/646; H04N 5/225; H04N 5/2253; H04N 5/2258; H04N 5/232; H04N 5/23248; H04N 5/23287; H04N 5/23296; G03C 17/00; G03C 17/12
See application file for complete search history.

(56) References Cited

U.S. PATENT DOCUMENTS

| | | |
|---|---|---|
| 2012/0287517 A1* | 11/2012 | Terajima ............ H02K 41/0356 359/824 |
| 2014/0009631 A1 | 1/2014 | Topliss |
| 2014/0160311 A1* | 6/2014 | Hwang ................ G02B 27/646 348/208.99 |
| 2014/0355120 A1 | 12/2014 | Yeo |
| 2015/0015729 A1 | 1/2015 | Kasamatsu |
| 2017/0094180 A1* | 3/2017 | Miller ................ H04N 5/23296 |

FOREIGN PATENT DOCUMENTS

| | | |
|---|---|---|
| JP | 2011521285 A | 7/2011 |
| JP | 2013024938 A | 2/2013 |
| JP | 2016045485 A | 4/2016 |
| TW | I457693 B | 10/2014 |
| TW | 201443546 | 11/2014 |
| WO | WO2013183270 A1 | 12/2013 |

\* cited by examiner

OPTICAL IMAGE STABILIZATION MECHANISM

CROSS REFERENCE TO RELATED APPLICATIONS

This Application claims priority claims priority of provisional U.S. Patent Application Ser. No. 62/265,106 filed Dec. 9, 2015 and Taiwan Patent Application No. 105113394 filed on Apr. 29, 2016, the entirety of which is incorporated by reference herein.

BACKGROUND OF THE INVENTION

Field of the Invention

The invention relates in general to a stabilization mechanism and in particular to an optical image stabilization mechanism.

Description of the Related Art

Conventional photo cameras, video cameras, and mobile phones usually comprise an optical system for capturing images. The optical system may vibrate due to external impact and cause deviation of the optical path, such that the images captured by the optical system can be blurry. Taiwan patent No. I457693 discloses a conventional optical image stabilization device. When the autofocus function is executed, a current is applied to the coil, and electromagnetic induction occurs between the coil and the magnet, so that the holder moves with respect to the base along the optical axis of the optical system. Two displacement sensors are disposed in the device to detect the position of the optical axis along the X and Y directions. When the optical axis deviates from the norm, electromagnetic induction can occur between the coils and the magnets, corresponding to the X and Y axes, so as to correct the position of the optical axis. However, owing to the considerable dimensions of the coils and the magnets, miniaturization of traditional optical image stabilization devices can be difficult.

BRIEF SUMMARY OF INVENTION

An optical image stabilization mechanism is provided, including a holder for holding a lens, a frame, a base, a first coil, a second coil, a displacement sensor, a first magnetic element, a second magnetic element, and a third magnetic element. The frame is movably connected to the holder and the base. The first coil is disposed on a side of the holder. The second coil is disposed on the base. The first and second magnetic elements are disposed on the frame and correspond to the first coil. The magnetic pole direction of the first magnetic element is opposite to that of the second magnetic element. The third magnetic element is disposed on the frame and corresponds to the second coil. The displacement sensor is disposed on the base to detect relative displacement between the lens and the base.

BRIEF DESCRIPTION OF DRAWINGS

The invention can be more fully understood by reading the subsequent detailed description and example with references made to the accompanying drawings, wherein.

DETAILED DESCRIPTION OF INVENTION

While the invention has been described in connection with various aspects, it will be understood that the invention is capable of further modifications. This application is intended to cover any variations, uses or adaptation of the invention following, in general, the principles of the invention, including such departures from the present disclosure as come within the known and customary practice within the art to which the invention pertains.

In the following detailed description of the preferred embodiments, reference is made to the accompanying drawings, and in which specific embodiments of which the invention may be practiced are shown by way of illustration. In this regard, directional terminology, such as "top," "bottom," "front," "back," etc., is used with reference to the orientation of the figures being described. The components of the present invention can be positioned in a number of different orientations. As such, the directional terminology is used for the purposes of illustration and is in no way limiting.

Figure 1:
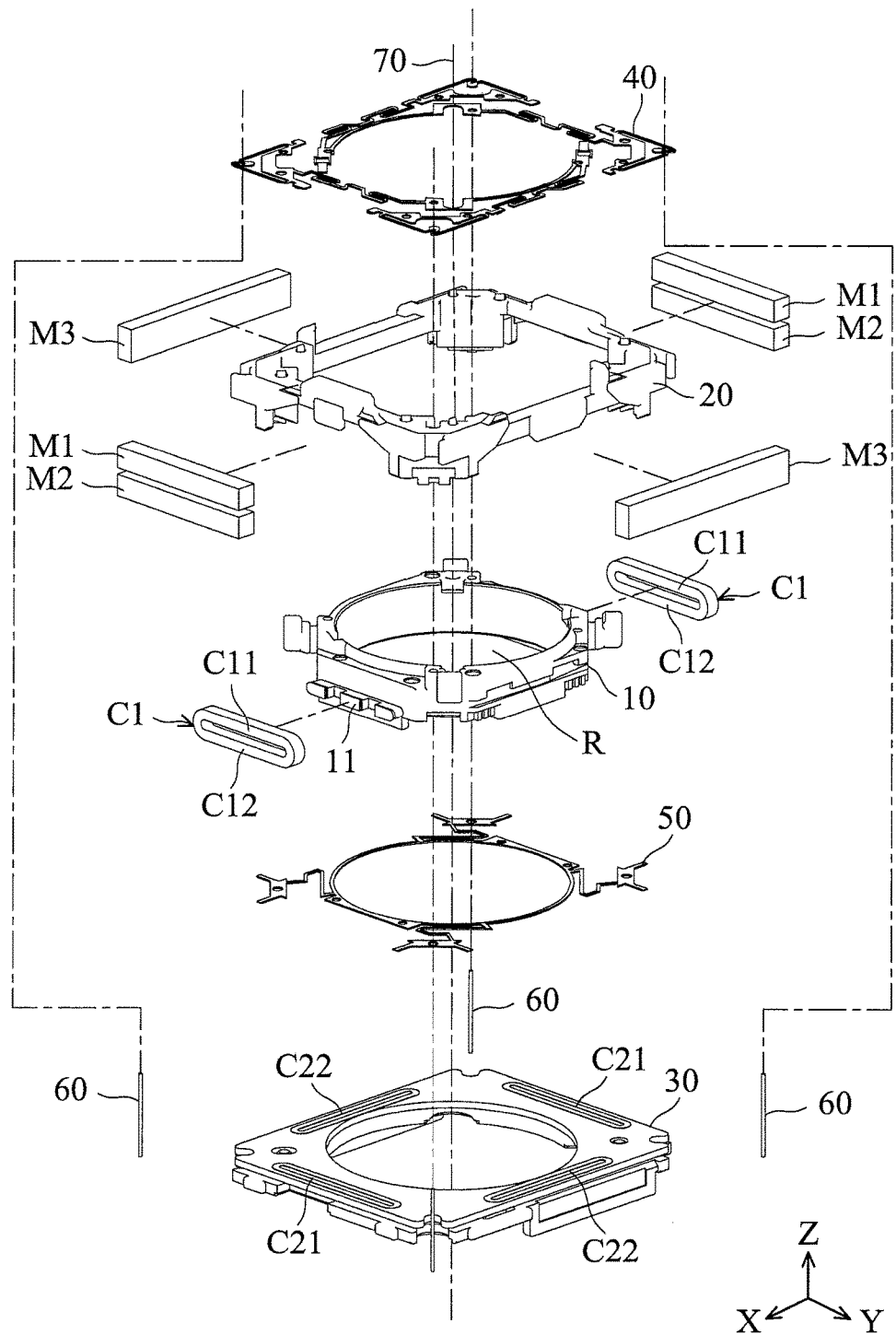
FIG. 1 is an exploded diagram of an optical image stabilization mechanism according to an embodiment of the invention.
Figure 2:
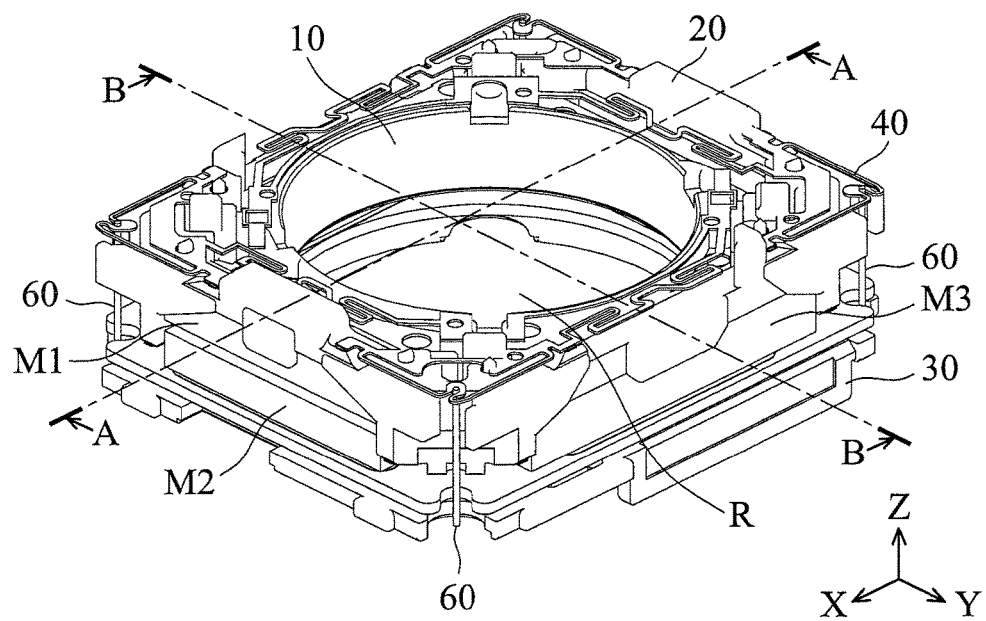
FIG. 2 is a perspective diagram of an optical image stabilization mechanism according to an embodiment of the invention.
Figure 3:
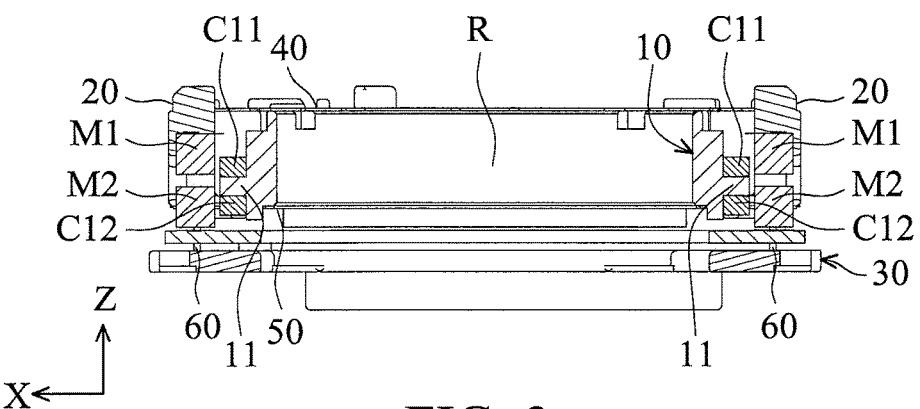
FIG. 3 is a sectional view of the optical image stabilization mechanism along the line A-A in FIG. 2.

Referring to FIGS. 1, 2 and 3, an embodiment of an optical image stabilization mechanism may be disposed in a camera or an electronic device having a camera, to compensate or suppress the image blur caused by the vibration of the camera. As shown in FIGS. 1, 2, and 3, the optical image stabilization mechanism 1 primarily comprises a holder 10, a rectangular frame 20, a base 30, an upper spring 40, a lower spring 50, a plurality of suspension wires 60, first coils C1, second coils C21 and C22, first magnetic elements M1, second magnetic elements M2, and third magnetic elements M3, wherein the first and second coils C1, C21 and C22 may have an elliptical structure. It should be appreciated that an image detecting unit (not shown), such as charge-coupled device (CCD), is disposed below and fixed to the base 30. Moreover, an optical lens (not shown) is disposed in the holder 10 and positioned corresponding to the image detecting unit. The base 30 is substantially perpendicular to an optical axis 70 of the optical lens. With the optical lens and the image detecting unit, the camera can be used for photography or recording video. Additionally, the optical image stabilization mechanism 1 between the optical lens and the image detecting unit can rapidly correct the horizontal deviation of the optical axis 70 and the optical lens along the X and Y axes, so as to compensate for image blur and obtain a better quality image.

As shown in FIG. 1, the holder 10 forms a space R for accommodating the optical lens, and the frame 20 can receive the holder 10 and the optical lens therein. A pair of first magnetic elements M1 are longitudinal and disposed on the frame 20, symmetrical to the optical axis 70, wherein the magnetic pole direction (N-S) of the first magnetic elements M1 are parallel to the X-axis. Similarly, a pair of second magnetic elements M2 are longitudinal and disposed on the frame 20, under the first magnetic elements M1, wherein the longitudinal axes (parallel to the Y-axis) of the second magnetic elements M2 are parallel to the longitudinal axes (parallel to the Y-axis) of the first magnetic elements M1. Specifically, the magnetic pole direction (N-S) of the second magnetic elements M2 are parallel to the X-axis, and opposite to the magnetic pole direction (N-S) of the first magnetic elements M1.

Referring to FIG. 1, a pair of third magnetic elements M3 are longitudinal and are disposed on the frame 20, symmetrical to the optical axis 70, wherein the longitudinal axes (parallel to the X-axis) of the third magnetic elements M3, the longitudinal axes (parallel to the Y-axis) of the first magnetic elements M1, and the optical axis 70 (parallel to the Z-axis) are perpendicular to each other. The magnetic pole direction (N-S) of the third magnetic elements M3 are parallel to the Y-axis. Specifically, the third magnetic elements M3 are disposed on two opposite sides of the frame 20, different from the first and second magnetic elements M1 and M2. It should be appreciated that the frame 20 in this embodiment has a rectangular structure. In some embodiments, the frame 20 may have a hexagonal or octagonal structure, and two third magnetic elements M3 are disposed on two opposite sides of the frame 20.

Referring to FIGS. 1-3, the holder 10 has two protrusions 11 respectively formed on opposite sides thereof, wherein the first coils C1 are disposed on the holder 10 and around the protrusions 11. In FIGS. 1 and 3, each of the first coils C1 has an upper half portion C11 corresponding to the first magnetic element M1, and a lower half portion C12 corresponding to the second magnetic element M2. Two pairs of second coils C21 and C22 are disposed on opposite sides of the base 30 along the X and Y axes, respectively corresponding to the first and second magnetic elements M1 and M2. A displacement sensor (not shown) is disposed on the base 30 for detecting the relative displacement between the holder 10 and the base 30.

Specifically, the holder 10 is connected to the upper spring 40, and the upper spring 40 is connected to the frame 20. Furthermore, the holder 10 is connected to the lower spring 50, and the lower spring 50 is connected to the frame 20. Hence, when the frame 20 is impacted by an external force, the holder 10 can move with respect to the frame 20 along the optical axis through the upper and lower spring 40 and 50, and the vibration of the camera can be efficiently absorbed, so as to avoid unintentional damage being done to the holder 10 and the optical lens disposed therein. Moreover, in this embodiment, an end of the suspension wire 60 is connected to the frame 20 by soldering, and the other end of the suspension wire 60 is connected to the base 30 by soldering. Thus, the frame 20 can move with respect to the base 30 along the direction perpendicular to the optical axis 70 (parallel to the XY plane) when impacted by an external force, and the horizontal vibration of the camera can also be efficiently absorbed.

The holder 10 is connected to the frame 20 through the upper spring 40 and the lower spring 50 which comprise elastic material, such as metal sheets. Hence, the moving direction of the holder 10 can be restricted and parallel to the optical axis 70. Moreover, as the frame 20 is connected to the base 30 via the suspension wire 60 which comprises elastic material, such as a thin metal rod, the frame 20 can be supported by the suspension wire 60. The holder 10 and the first, second, and third magnetic elements M1, M2 and M3 are disposed on the frame 20 and constitute a suspension mechanism. When the frame 20 is impacted by an external force, the frame 20 can move with respect to the base 30 along the direction perpendicular to the optical axis 70 (parallel to the XY plane), so that the vibration of the camera can be efficiently absorbed.

In practice, when the autofocus function is executed, a current is applied to the first coils C1, and electromagnetic induction occurs between the first coils C1 and the first and second magnetic elements M1 and M2. Hence, the holder 10 fixed to the first coils C1 can move along the optical axis 70 to achieve the rapid focusing of the camera.

Additionally, when the optical axis 70 deviates from the norm due to a vibration caused by the user, the horizontal displacement (parallel to the XY plane) between the frame 20 and the base 30 can be detected by the displacement sensor on the base 30, and the deviation quantity of the of the optical axis 70 can be determined. To correct the optical axis 70 to the right position, a current can be applied to the second coils C21, and electromagnetic induction occurs between the second coil C21 and the second magnetic elements M2 corresponding thereto, so that the second magnetic elements M2 and the frame 20 move with respect to the base 30 along the X axis. Similarly, when a current is applied to the second coils C22, electromagnetic induction occurs between the second coil C22 and the third magnetic elements M3 corresponding thereto, so that the third magnetic elements M3 and the frame 20 move with respect to the base 30 along the Y axis. Thus, the optical axis 70 and the lens can be controlled to move along the XY plane for rapid displacement compensation, and the image blur can be efficiently suppressed.

Figure 4:
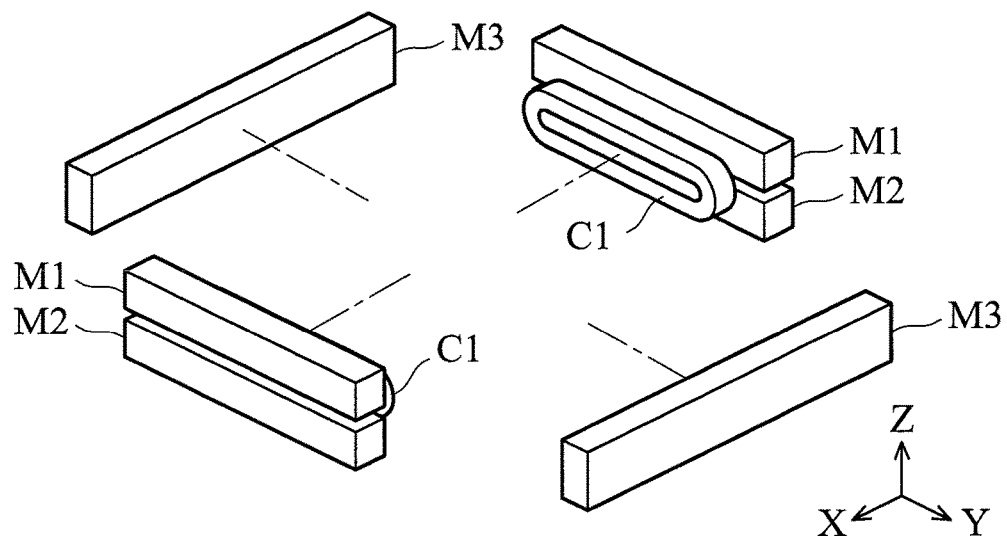
FIG. 4 is a perspective diagram showing the relative positions of the first magnetic elements M1, the second magnetic elements M2, the third magnetic elements M3, and the first coils C1.
Figure 5:
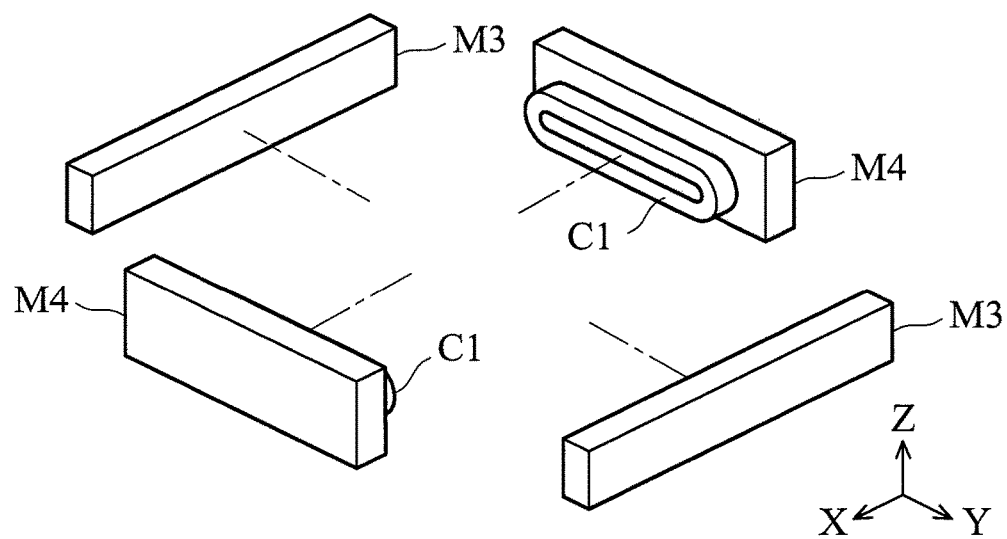
FIG. 5 is a perspective diagram showing two multi-polar permanent magnets M4 which are integrally formed in one piece, to substitute for the first magnetic elements M1 and the second magnetic elements M2 in FIG. 4.
Figure 6:
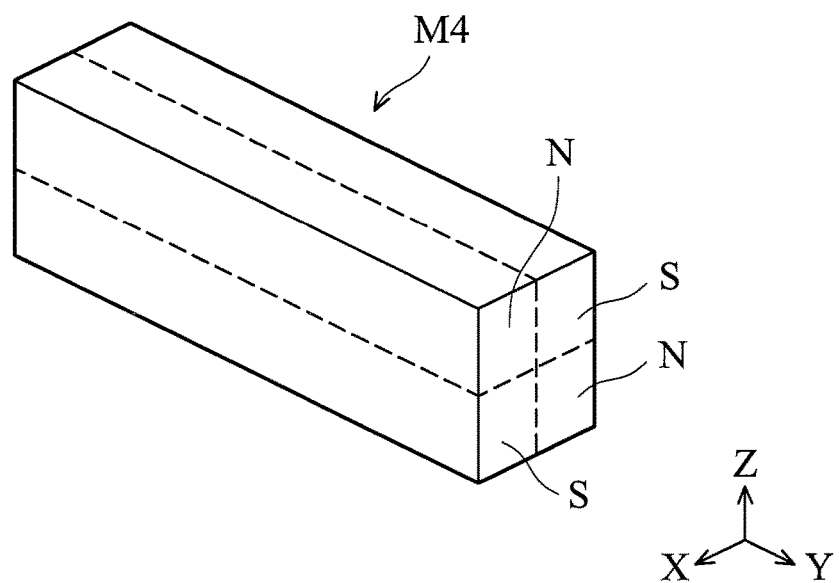
FIG. 6 is an enlarged perspective diagram of the multi-polar permanent magnet M4.
Figure 7:
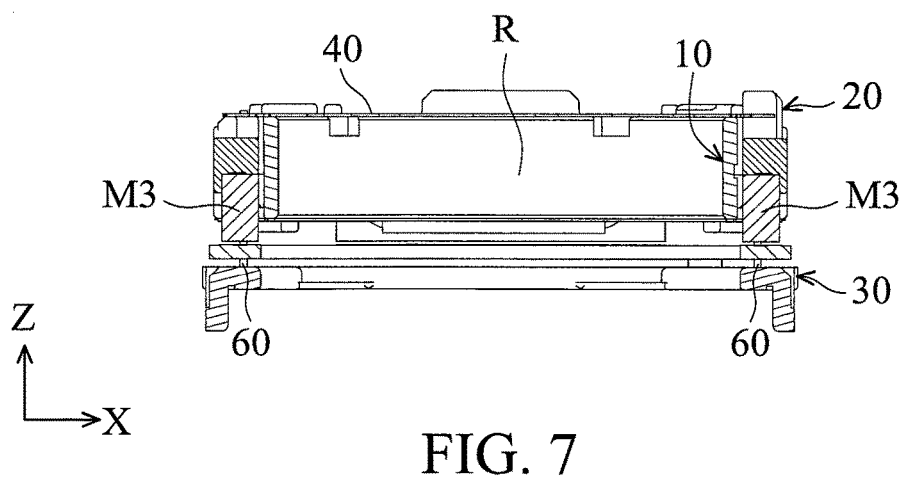
FIG. 7 is a sectional view of the optical image stabilization mechanism along the line B-B in FIG. 2.

Referring to FIG. 4, the first and second magnetic elements M1 and M2 may respectively comprise a permanent magnet, and the magnetic pole directions (N-S) of the two permanent magnets are opposite to each other. Referring to FIGS. 5 and 6, in some embodiments, the first and second magnetic elements M1 and M2 may be integrally formed in one piece as a multi-polar permanent magnet M4, wherein the volume of the multi-polar permanent magnet M4 exceeds or equals that of the third magnetic element M3. As shown in FIG. 6, the magnetic pole direction (N-S) in the upper portion of the multi-polar permanent magnet M4 is opposite to the magnetic pole direction (N-S) in the lower portion of the multi-polar permanent magnet M4 along the X-axis. Namely, the two permanent magnets M1 and M2 in FIG. 4 can be replaced by the single multi-polar permanent magnet M4, so that the production cost and the assembly of the optical image stabilization mechanism 1 can be reduced. Referring to FIG. 7, an embodiment of the third magnetic element M3 may be a permanent magnet. As the third magnetic elements M3 are positioned only corresponding to the second coil C22 on the base 30, there is no need to provide any other coil on the holder 10 to correspond to the third magnetic elements M3. Thus, the dimension of the optical image stabilization mechanism 1 along the Y axis can be reduced, and miniaturization and low power consumption of the optical image stabilization mechanism can also be achieved.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical image stabilization mechanism for moving a lens, including:
    only one holder configured to hold the lens;
    only one frame, movably connected to the holder and having a rectangular structure;
    a base, wherein the frame is movably connected to the base;
    a pair of first coils, disposed on opposite sides of the holder, corresponding to two short sides of the optical image stabilization mechanism;
    a plurality of second coils, disposed on the base;
    a pair of first magnetic elements, disposed on the frame and corresponding to the first coils;
    a pair of second magnetic elements, disposed on the frame and corresponding to the first coils and two of the second coils, wherein a magnetic pole direction of the first magnetic elements is opposite to that of the second magnetic elements, and a current is applied to the first coils to cause electromagnetic induction between the first coils and the first and second magnetic elements, so that the holder moves with respect to the base along an optical axis of the lens; and
    at least a third magnetic element, disposed on the frame and corresponding to one of the second coils, wherein a current is applied to the second coils to cause electromagnetic induction between the second coil and the second and third magnetic elements, so that the frame moves with respect to the base along a direction perpendicular to the optical axis.

2. The optical image stabilization mechanism as claimed in claim 1, wherein one of the first magnetic elements and one of the second magnetic elements are integrally formed in one piece as a multi-polar permanent magnet.

3. The optical image stabilization mechanism as claimed in claim 2, wherein the at least third magnetic element has a permanent magnet.

4. The optical image stabilization mechanism as claimed in claim 3, wherein a volume of the multi-polar permanent magnet exceeds or equals that of the at least third magnetic element.

5. The optical image stabilization mechanism as claimed in claim 2, wherein one of the first coils has an upper half portion corresponding to one of the first magnetic elements and a lower half portion corresponding to one of the second magnetic elements.

6. The optical image stabilization mechanism as claimed in claim 1, wherein the holder has two protrusions, and the first coils are disposed around the protrusions.

7. The optical image stabilization mechanism as claimed in claim 1, wherein one of the first coils has an upper half portion corresponding to one of the first magnetic elements and a lower half portion corresponding to one of the second magnetic elements.

8. The optical image stabilization mechanism as claimed in claim 1, further including:
    a pair of third magnetic elements, being longitudinal and symmetrical to the optical axis, wherein longitudinal axes of the third magnetic elements, longitudinal axes of the first magnetic elements, and the optical axis are perpendicular to each other.

9. The optical image stabilization mechanism as claimed in claim 1, wherein each of the first coils has an elliptical structure.

* * * * *